United States Patent [19]

Okuda et al.

[11] 4,122,337
[45] Oct. 24, 1978

[54] PRESSURE-ELECTRICAL SIGNAL CONVERSION MEANS

[75] Inventors: Isamu Okuda, Yamatokoriyama; Hiroshi Horii, Kashihara; Keijiro Mori, Nara, all of Japan

[73] Assignee: Matsushita Electric Industrial Co., Ltd., Kadomashi, Japan

[21] Appl. No.: 771,675

[22] Filed: Feb. 24, 1977

[30] Foreign Application Priority Data

Feb. 26, 1976 [JP] Japan .................................. 51-21501
Jul. 1, 1976 [JP] Japan .................................. 51-78708

[51] Int. Cl.² .............................................. G01D 5/34
[52] U.S. Cl. ............................. 250/231 P; 250/211 K
[58] Field of Search ............... 250/231 R, 231 P, 237, 250/211 K, 239; 73/37

[56] References Cited

U.S. PATENT DOCUMENTS

| | | | |
|---|---|---|---|
| 3,159,750 | 12/1964 | Kazan | 250/231 P |
| 3,191,440 | 6/1965 | Miller | 250/231 P |
| 3,258,601 | 6/1966 | Suleski | 250/211 K |
| 3,612,881 | 10/1971 | King | 250/231 P |
| 3,624,404 | 11/1971 | Hines | 250/231 P |

*Primary Examiner*—David C. Nelms
*Attorney, Agent, or Firm*—Wenderoth, Lind & Ponack

[57] ABSTRACT

The present invention is a pressure-electrical signal conversion means comprising a diaphragm assembly which is moved in accordance with the difference of pressure between two compartments therein, illumination means able to direct light in a band onto a photosensitive unit which includes two elements so disposed that when any particular band of the photosensitive area is illuminated the illuminated area of one element is greater than that of the other, this photosensitive element produces an output proportional to the relative size of the illuminated areas of these elements, the photosensitive unit and illumination means being movable relative to one another in proportion to the movement of the diaphragm.

23 Claims, 37 Drawing Figures

PRESSURE-ELECTRICAL SIGNAL CONVERSION MEANS

The present invention relates to a means for the conversion of a pressure to an electrical signal. More particularly the invention relates to a pressure-electrical signal conversion means which has a simple and rugged construction but which is also sensitive to small pressure changes.

There is known a considerable variety of pressure-electrical signal conversion means, conventional means including for example devices employing differential transformers, or piezo-resistance elements, or means in which electrical signals are produced in response to changes of inductance, which varies in accordance with variation of pressure. A common feature of all these means is that they demand employment of expensive component parts. Another disadvantage of these means are that in order to produce a utilizable signal it is generally necessary to incorporate complex amplifier circuits in the means, which renders the conversion unit as a whole more liable to breakage. It has been found difficult to achieve sensitivity to small values or small differences of pressure. It has been known to provide conversion means with improved sensitivity by employing one or more photosensitive cells, for example cadmium sulfide cells, or employing so-called silicon stress elements, i.e., elements whose electrical properties vary with distortion strain imposed thereon and in which detectable strain can be produced by comparatively small values of stress. However, these elements have the disadvantage that they tend to be unreliable since they are particularly sensitive to ambient temperature and deteriorate rather rapidly with time.

It is accordingly an object of the present invention to provide a means which produces easily detectable electrical signals in response to and closely proportional to small values or variations of the pressure of a fluid, for example several millimeters of water.

It is another object of the invention to provide a pressure-electrical signal conversion means which maintains good response characteristics over long periods of service and is comparatively unaffected by ambient conditions.

It is yet another object of the invention to provide a pressure-electrical signal conversion means which does not require employment of complex electronic circuits and may be produced at very low cost.

It is a further object of the invention to provide a pressure-electrical signal conversion means which employs only rugged elements, whereby the means is more resistant to overload or impact and easier to manufacture and handle.

It is a still further object of the invention to provide a means which is particularly suited to precise detection of pressure variation in a system for measurement of or automatic control of fluid pressure or rate of flow.

In accomplishing these and other objects there is provided, according to the present invention, a means wherein light from a light source is caused to illuminate different portions of a photosensitive unit in accordance with the difference in the pressure of fluid in two compartments defined in main housing portions of the means. These two compartments are connected to different sources of fluid, and separated by a diaphragm and displacement plates which are fixed to the diaphragm. The photosensitive unit is constituted by two identical elements each of which has a wide end and decreases evenly in width to a narrow end. These elements are disposed adjacent to one another in a manner such the increasingly wide portion of one element is in line with the increasingly narrow portion of the other element. These elements are connected to a common electrode and to independent electrodes, these electrodes being connected to an output circuit which is suitably external to the main housing..

Except when the central portion of the photosensitive unit is illuminated, the illuminated area of one constituent element thereof is greater than the illuminated area of the other constituent element, and the output circuit produces a signal which is proportional to this difference of illuminated areas. In other words, the output signal is proportional to the difference in pressure of the fluid from the different sources.

Since the photosensitive unit is constituted by identical, symmetrically disposed elements, variation of the characteristics of these elements or of other elements of the conversion means which may be caused due to variation in ambient conditions cancel one another, and good linearity of response is achieved in varying working conditions.

Further, while the main elements of the means of the invention are simple and rugged the output signal obtained is a DC signal of the order of 0.3 V per 1 mmAq change in pressure difference, and is easily stepped up to a level for actuation of a servo-control means, for example, without use of complex amplification or frequency modulation circuits.

A better understanding of the present invention may be had from the following full description thereof when read in conjunction with the attached drawings, in which like reference numerals refer to like parts, and FIG. 1 is a cross-sectional view showing the main features of construction of a first embodiment of the invention;

Figure 35:
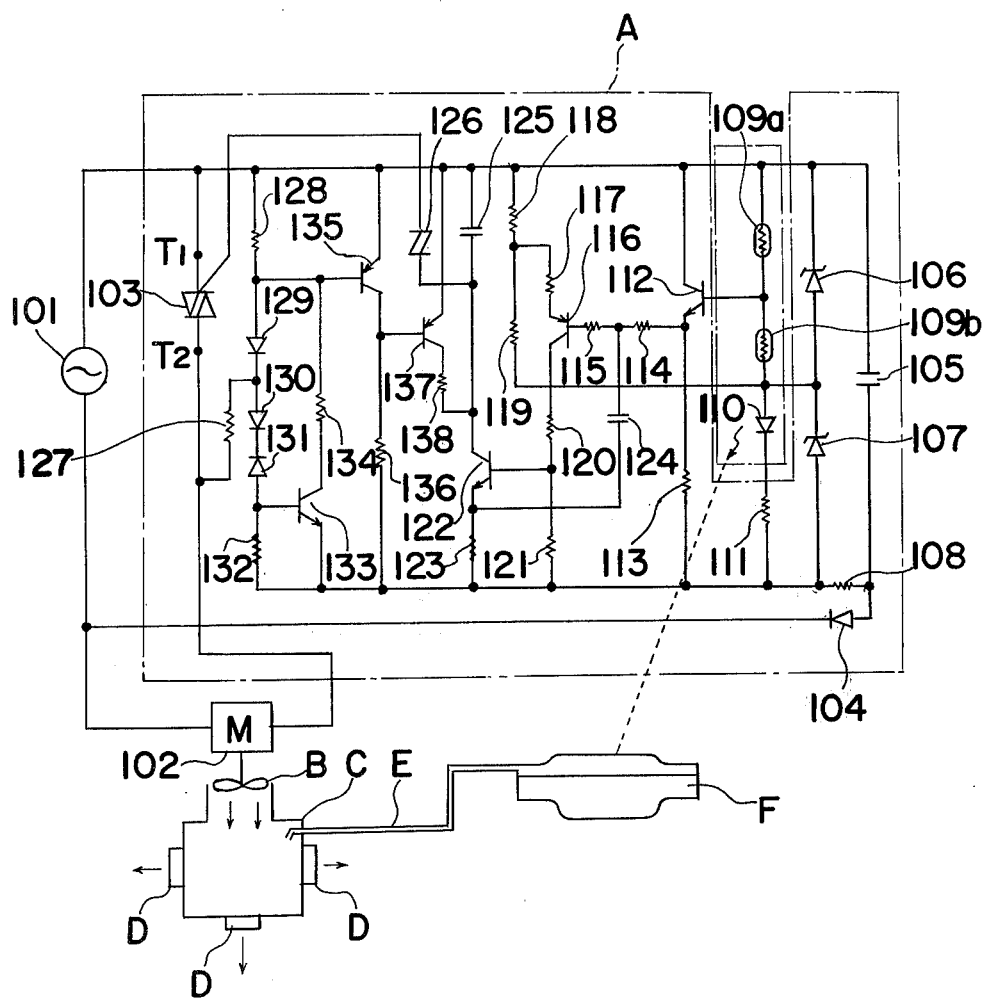
Figure 36:
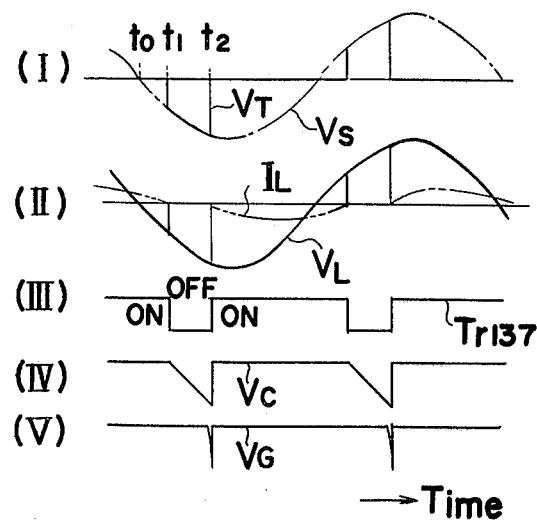
Figure 37:
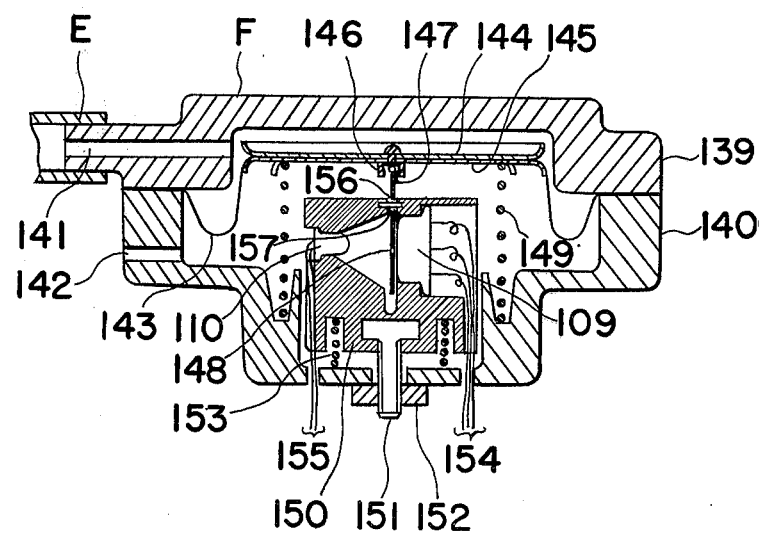

FIG. 35 schematically illustrates the construction of and the configuration of an electric circuit employed in a pressure control system employing the means of the invention;

FIG. 36 is an time chart illustrating the operation of the circuit of FIG. 35; and FIG. 37 is a cross-sectional view of the pressure-electric signal conversion means employed in the control system of FIG. 35.

Figure 1:
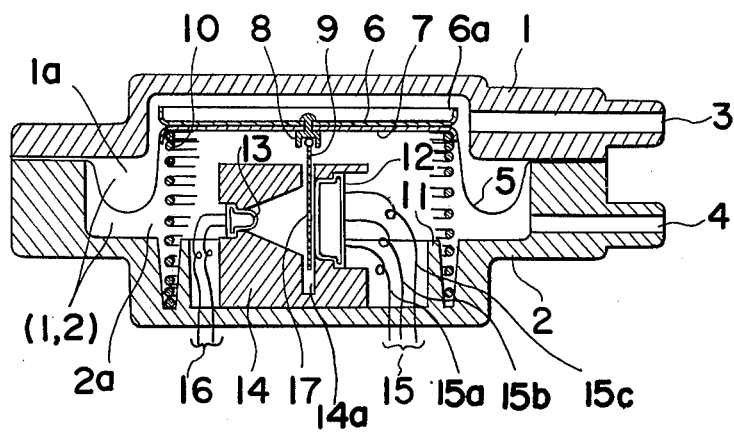

Referring initially to FIG. 1 there is shown in cross-section a pressure-electrical signal conversion means according to a first embodiment of the invention comprising a high-pressure side casing 1 and a low-pressure side casing 2. The casings 1 and 2 comprise the outer walls of the first embodiment, are in a facing relationship to one another, casing 1 being above casing 2, have peripheral portions which are joined to one another, and together define an interior space (1, 2) in which are accommodated various elements of the means described below. The joint between the casings 1 and 2 is made imprevious to the particular fluid whose pressure variations the means is required to detect. In the high pressure side casing 1 there is a high pressure port 3, through which high pressure fluid may enter the upper portion of the interior space (1, 2). The low pressure side casing 2 similarly has a low pressure port 4 through which low pressure fluid may enter the lower portion of the interior space (1, 2). The interior space (1, 2) is enclosed apart from the access thereto provided by the ports 3 and 4. It will be understood the terms 'high-pressure fluid' and 'low pressure fluid' refer simply to relative values of pressure of fluid entering the ports 3 and 4, and that the pressure of fluid entering one port may in fact be very close to that of fluid entering the other port.

The interior space (1, 2) is divided into a high pressure compartment 1a and a low pressure compartment 2a by a diaphragm 5 and displacement plates 6 and 7. These determine the range of response of the conversion means to pressure differences in a manner described below. The diaphragm 5 extends between the joint portions of the casings 1 and 2, over the entire surface area defining the boundary between the high pressure compartment 1a and low pressure compartment 2a a generally central portion of diphragm 5 is clamped between the plates 6 and 7 which are fixed in flat relationship to one another by a fixed stud 8 provided at the central portions thereof. The plate 6 is uppermost and has an upper surface constituting a portion of the lower boundary of the high pressure compartment 1a, and the plate 7 is lowermost and has a lower surface constituting a portion of the upper boundary of the low pressure compartment 2a. That portion of the diaphragm 5 which extends between the clamped central portion thereof and the joint portions of the casings 1 and 2 dips and is sufficiently large to permit unhindered upward and downward movement of the plates 6 and 7 in an action described below. Edge portions 6a of the upper plate 6 are upturned and may come into contact with the inner surface of the high-pressure casing 1 and so prevent more than a certain amount of upward movement of the plates 6 and 7.

Affixed to the inner surface of the low pressure side casing 2 there is a mounting block 14, which extends upwards to approximately the center of the interior area (1, 2). A generally central portion of mounting block 14 defines a vertically disposed slot 14a, which is closed at the bottom and open at the top. A plate 9 whose upper end is attached to the stud 8, is slidably accomodated in slot 14a, and in a generally central portion of plate 9 there is defined a rectangular slit 17 whose long axis is horizontal. A limit to the downward movement of plates 6, 7 and 9 is imposed by stud 8 coming into contact with block 14. The mounting block 14 defines a small central open area at one side of which there is provided a small light source 13 which is mounted in an opening in the block 14, and at the other side of which there is provided a photosensitive unit 12 which is suitably constituted by photoconductive elements. Photo sensitive unit 12 has a construction which is described in greater detail below and the center of which is effectively, in a horizontal line with the light source 13, the unit 12 and source 13 being very close to one another. The slide plate 9 lies between the light source 13 and the photosensitive unit 12 and is almost flush with the light-receiving surface of the unit 12, whereby the unit 12 may be illuminated only by light which passes through the slit 17 defined in the plate 9. Leads 16 which pass through the low-pressure side connect the light source 13 to an external actuation circuit not shown. Leads 15a, 15b and 15c supply the output from the photosensitive unit 12 to an external element not shown which is desired to be actuated in response to changes in the difference between the pressure of the fluid entering port 3 and that of the fluid entering port 4.

Inner wall portions of the low-pressure side casing 2 located around the mounting block 14 define a slot 11 which accommodates the lower end portion of a compression coil spring 10 whose upper end is attached to peripheral portions of the lower surface of the above-mentioned plate 7.

Action of the abovedescribed means in one set of operating conditions described by way of example is as follows. The fluid employed is air, and the low pressure port 4 is left open, whereby the pressure in the low pressure compartment 2a is equal to atmospheric pressure $Po$. Air under pressure $Ps$ is introduced into the high pressure compartment 1a via port 3. This causes plates 6 and 7, and hence plate 9, to be moved downwards in the low pressure direction by an amount which depends on the difference $Ps - Po$ of pressure in compartments 1a and 2a and on the force exerted by compression spring 10. Movement of plate 9 causes a corresponding displacement of slit 17 defined therein. In other words when light source 13 is actuated the portion of photosensitive unit 12 which is illuminated through slit 17 depends on pressure difference $Ps - Po$ and the force of spring 10. The range of displacement of the slit 17 is determined by the distance between the edge portions 6a and the high pressure casing 1 and the distance between the lower surface of the stud 8 and the upper surface of the mounting block 14 when the pressure is equal in compartments 1a and 2a.

Figure 2:
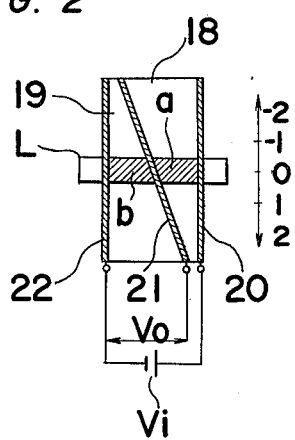
FIG. 2 is a schematic drawing showing the principles of construction of the photosensitive unit employed in the means of the invention.

Referring now to FIG. 2, the photosensitive unit 12 is basically constituted by a pair of identical photoconductive elements 18 and 19, for example CdS, CdSe, or silicon elements. Each of these has a regularly varying width, and they are mounted next to one another in a manner such that the broadest part of one element is in line with the narrowest part of the other. The elements 18 and 19 in the example shown in the drawing are triangular and are placed together to define a rectangle. Element 18 is provided with an independent electrode 20 which connects through the abovementioned lead 15a to the positive terminal of a voltage source $Vi$, element 19 with an independent electrode 22 which connects through lead 15c to the negative terminal of voltage source Vi, and there is further provided an electrode 21 which is common to both elements 18 and 19 and connects to lead 15b. The output of the unit 12 is the potential difference Vo across the leads 15b and 15c. Unit 12 is illuminated by a band of light L which has passed through the abovementioned slit 17 and extends over the entire width of unit 12. If slit 17 is located centrally with respect to unit 12, in the position $X = 0$ shown in FIG. 2, the size of area a of element 18 illuminated by the light L is equal to that of illuminated area b of element 19. In any other position of slit 17 areas a and b differ in size and the values of resistance presented by elements 18 and 19 are therefore different. A varying output Vo is therefore obtained which increases as the band of light L moves upwards, to increase the illuminated area a of element 18 and to decrease the illuminated area b of element 19. In the description below, upward and downward movement of the band of light 17 from the central position $X = 0$ is measured in millimeters and defined as positive and negative displacement respectively.

Needless to say, as long as it is centered on the long axis of the photosensitive unit 12 the slit 17 may have a shape other than rectangular, and the neutral position of the slit 17 determined by the spring 10 when there is equal pressure in compartments 1a and 2a is not necessarily such that the illuminated areas a and b are equal.

Referring to the assembly of plates 6 and 7 and diaphragm as diaphragm 5 for simplicity, if the effective area S of diaphragm 5 is 32 cm², the spring constant $k$ of compression spring 10 is 16 g/mm, and the displacement range $l$ of the band of light L is 4 mm, then the displacement range $l$ is sufficiently small with respect to the spring constant $k$ to permit the variation of force imposed by displacement of the spring 10 to be ignored, and for each 1 mmAq of pressure difference $P = Ps - Po$, the pressrue force 5 imposed on the diaphragm 5 is:

$$f = 1/10\ S = 3.2\ g/mmAq.$$

As the spring constant $k$ of spring 10 is 16 g/mm, there is a 0.2 mm displacement of the band of light L for each 1 mmAq of pressure difference P. The relative disposition and dimensions of plate 9, slit 17, spring 10 and photosensitive unit 12 are such that when the pressure difference $P = 10$ mmAq., the band of light L is located at the position $X = 0$, as shown in FIG. 2. In this condition, when light source 13 is actuated and a voltage $Vi = 10$ V is imposed across electrodes 20 and 22 of unit 12, the output voltage Vo is 5V, as plotted both in FIG. 3 and in FIG. 4. If now the pressure difference P is varied, there is positive or negative displacement of the band of light L according to whether pressure difference P increases or decreases, and since the displacement is 0.2 mm/mmAq, the displacement range $l$ of 4 mm, i.e., from $X = +2$ mm to $X = -2$ mm, corresponds to a variation of pressure difference P over the range of from $P = 9$ mmAq to $P = 20$ mmAq. The output voltage Vo over this range of displacement of the band of light L varies linearly, as shown in FIG. 4, and covers the comparatively wide range of from 2V to 8V.

Advantages offered by the abovedescribed means may be summarized as follows.

(1) There is good response to small changes in pressure and variation of voltage output with respect to variation of pressure is linear. Further, proportional the response of the means, i.e., the amount of change of output voltage for a given change in pressure, may be varied by simply selecting compression coil springs having different spring constants, and the detection range may be altered by varying the dimensions of the spring and the dimensions of the interior portion of the conversion means between the block 14 and the low-pressure casing 1. Thus, the conversion means is easily adaptable for use for different types of measurement or detection of pressure over different ranges.

(2) Since the photosensitive unit 12 is constituted by two identical elements and output is determined by the relative size of the illuminated areas of these elements, any variation in physical properties of these elements which may occur due to variation in ambient conditions cancel out, and a faithful response is achieved over the whole range of temperatures, etc., encountered in normal working conditions. This symmetry of construction of the unit 12 also ensures a fidelity of response despite a fall in light-emission efficiency of the light source 13, since both photosensitive elements 18 and 19 are illuminated by the same source, and the conversion means of the invention thus offers the advantage of reliable response over a long period of service. If the photosensitive unit 12 is constituted by a hermetically sealed photoconductive cell and the light source 13 by a photoemissive diode, a service life of more than 100,000 hours may be achieved.

Figure 3:
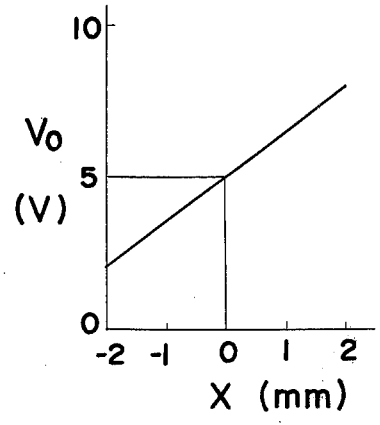
FIG. 3 is a graph plotting the characteristics of the unit of FIG. 2.
Figure 4:
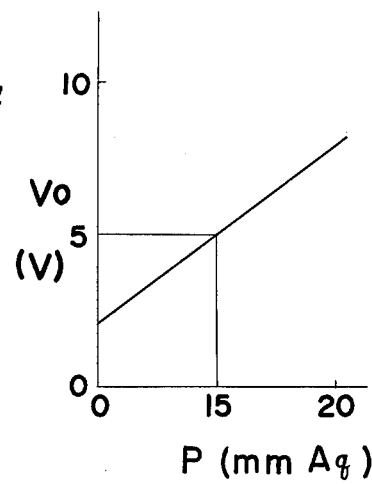
FIG. 4 is a graph plotting the performance of the means of FIG. 1.

(3) When, for example, photoconductive cells are employed to constitute the unit 12, as shown in FIG. 3, a sufficiently large DC voltage Vo is obtained as the output without there being any need for complex frequency modulation or phase modulation circuits such as are required in conventional means.

Also, if the output impedance in the output signal circuit is high, i.e., 100 K or more, the output is easily detectable by means of a single transistor forming an emitter follower circuit, and there is no need for employment of costly or complex circuit elements.

Since, in addition, the other elements of the conversion means, the diaphragm, compression coil spring, etc., are inexpensive, the whole unit may be produced at very low cost.

(4) In contrast to conventional means, which normally demand employment of very delicate, and hence easily breakable, elements to detect small values or small changes of pressure, the means of the invention permits this detection using only rugged elements such as described above, and is therefore much more adapted for use in rough working conditions and does not require especially careful handling, during manufacture, transportation, or installation.

There are of course many possible modifications of the means of FIG. 1 which will be apparent to those skilled in the art, examples of such modifications are as follows.

(1) Instead of a compression spring, there may be employed a tension coil spring or plate spring means mounted in the high pressure side 2a.

(2) Instead of being provided in the low pressure compartment 2a, the light source 13 and photosensitive unit 12 may be provided in the high pressure compartment 1a.

(3) For measurement of particularly small pressures, to give improved temperature characteristics, etc., the portion of the diaphragm 5 which extends between the plates 6 and 7 and the casings 1 and 2 should be almost flat, the dip of this portion of the diaphragm being suitably of the order of 0.1 to 0.2 times the thickness of the diaphragm, if the diaphragm is made of rubber material.

Selection of the material of the diaphragm is of course made in reference to the type of fluid whose pressure changes are to be detected, silicon rubber being a suitable material if the fluid is air, for example. Also, instead of a sheet diaphragm such as shown in FIG. 1, there may be employed a bellows element or an undulated diaphragm.

(4) There may be employed an undulated metallic element which serves both as a diaphragm and as a spring element to assist positioning of the slit plate 9.

(5) Instead of being fixedly attached to the stud 8, the slit plate 9 may be attached thereto by a hinge or rotary ball element, which permits the plate 9 to pivot slightly about its upper end and move slightly to the left and right as seen in the drawing while being guided in a slot defined in the mounting block 14. In this case, the plates 6 and 7 need not be perfectly horizontal when they are moved due to difference of pressure between the compartments 1a and 2a, since the plate 9 naturally swings into a vertical alignment, so avoiding frictional contact with the block 14 and ensuring maintenance of accurate control of illumination of the photosensitive unit 12, even if the plates 6 and 7 are slightly tilted.

(6) To further ensure that exposure of the photosensitive unit 12 is limited to exposure by light passing through the slit 17 defined in the plate 9, as well as ensuring that the plate 9 remains very close to the unit 12, it is also advantageous to impart a mat, black surface to the plate 9 and block 14 portions adjacent to or in line with the slit 7, in order to keep the passage of reflected light through the slit 17 to a minimum.

(7) To increase the effective range over which the band of light L may be displaced, while maintaining a linear relationship between pressure changes and output of the conversion means, the distance between the plate 9 and the photosensitive unit 12 may be made smaller and the distance between the plate 9 and the light source 13 may be made larger, and also as far as possible the light source may be made a point source, which may be achieved by employing a glass or resin encapsulated photoemissive diode.

(8) The photosensitive unit 12 may be constituted by CdS or CdSe photoconductive cells or silicon cells, as noted above, and in addition to elements whose resistance varies in response to incident light, there may also be employed selenium photovoltic elements which produce varying amounts of electromotive force in response to incident light.

Figure 5:
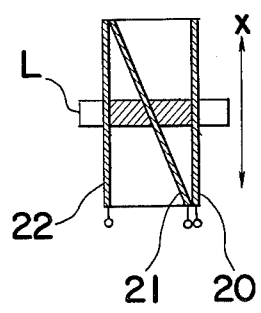
FIGS. 5 and 6 are schematic drawings showing modifications of the photosensitive unit according to the invention.
Figure 6:
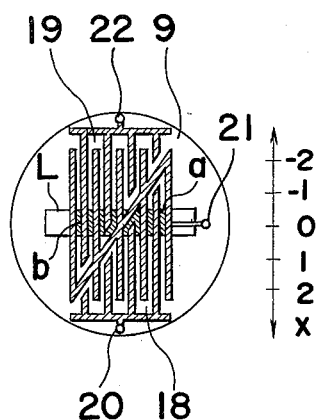

(9) The elements 18 and 19 constituting the photosensitive unit 12 may be triangular blocks of uniform material as shown in FIG. 5, or each may be constituted by grid elements or varying length which project from an independent straight-bar electrode constituting the short side of the unit 12, the common electrode being defined by an N-shaped base element whose outer sides define the long sides of the unit 12 and grid elements which are attached to the cross portion and which extend between the grid elements of the elements 18 and 19, as shown in FIG. 6. The construction of FIG. 6 has the advantage that the impedance of the unit is less and the processing of output signals is therefore easier, but it should be noted that since the elements 18 and 19 do not actually contact the common electrode, the width of the slit 17 must be very large compared with the clearance between the elements 18 and 19 and the crossbar portion of the common electrode, and that there is liable to be poor linearity of response if the slit 17 is made too narrow.

Figure 7:
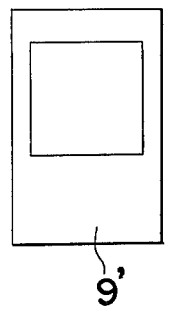
FIGS. 7 and 8 are explanatory drawings of alternative methods of illumination of the photosensitive unit.
Figure 8:
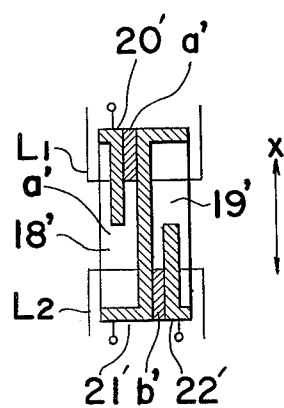

Referring to FIG. 7, instead of slit board 9 there may be employed frame 9' which supports a square or rectangular opaque board in a generally central portion. In this case, as shown in FIG. 8, the unit 12 is constituted by elements 18' and 19' which are in the form of straight strips of material and are respectively sandwiched between an independent electrode 20' and a common electrode 21', and an independent electrode 22' and the common electrode 21', and which extend downwards and upwards to the level of the center of the unit 12, whereby a greater area $a'$ of the element 18 and a smaller area b of the element 19 are illuminated by bands of light L1 and L2 passing above and below the opaque portion of the frame 9' as the frame 9' moves downwards, and vice-versa. With this construction, the effective displacement range of the frame 9' is one half the height of the opaque portion thereof.

The description continues below in reference to other embodiments of the invention.

Figure 9:
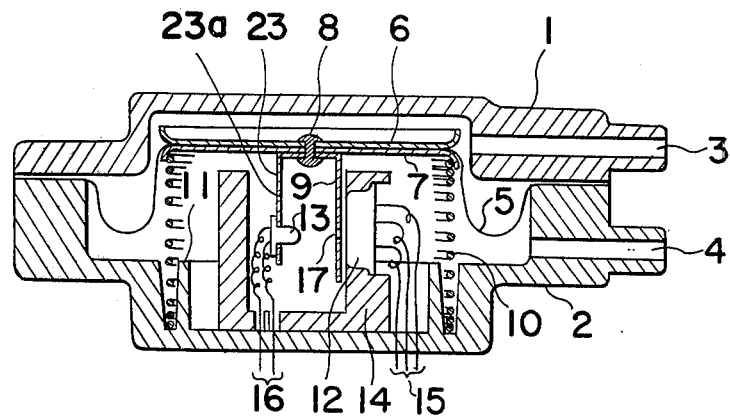
FIGS. 9, 10 and 11 are cross-sectional views of other embodiments of the invention.

Referring to FIG. 9, according to a second embodiment of the invention, instead of being mounted in the block 14, light source 13 is held fixed to one arm 23a of a generally U-shaped bracket 23, whose base is attached to the lower surface of the displacement plate 7 by the stud 8 and whose other arm is in a parallel facing relationship to the arm 23a and in effect defines the plate 9 having a slit 17 defined therein, the slit 17 being in horizontal line with the light source 13. In this case, when the plates 6 and 7 are moved both the source 13 and the slit 17 are displaced identical amounts and different portions of the fixedly mounted photosensitive unit 12 are illuminated depending on the amount of this displacement. With this arrangement, elimination of reflected light may be achieved by providing an opaque sleeve element, not shown, which extends between the light source 13 and the slit 17. The leads 16 inside the conversion means are of course made long enough and flexible enough to permit unhindered upward or downward movement of the bracket 23.

Figure 10:
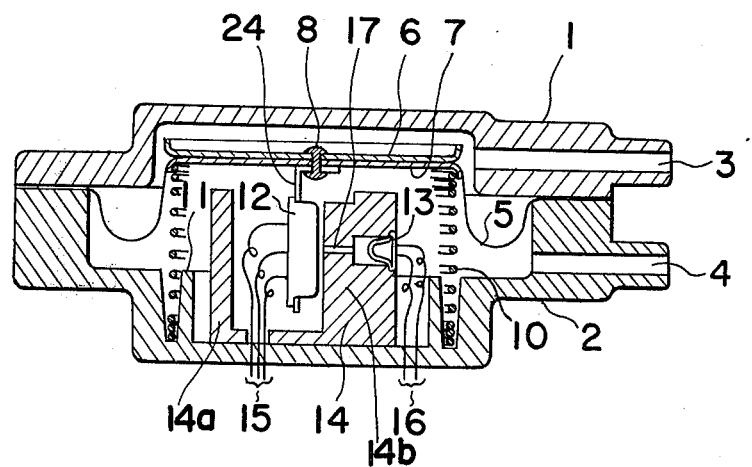

In FIG. 10, the light source 13 is mounted in and enclosed by an outer wall portion 14b of the mounting block 14. The slit 17 is not movable but is defined in the block 14 in line with the light source 13 and extends from the location of the light source 13 to the surface of an wall portion 14b which is opposite to the wall portion 14a of the block 14. The upper end of the photosensitive unit 12 is attached to an angle piece 24 which is fixed to the central portion of the lower surface of the displacement plate 7 by the stud 8, and which holds the photosensitive unit 12 close to the wall portion 14b of the block 14 and causes the unit to be moved up and down as the plates 6 and 7 are moved up and down. This embodiment gives the same general advantages as the embodiment of FIG. 9.

Figure 11:
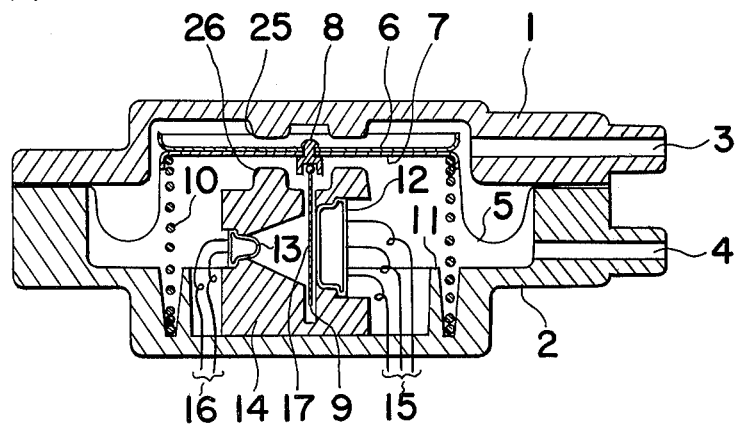
Figure 12:
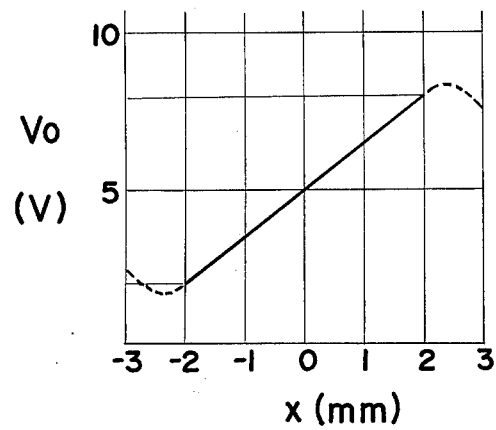
FIGS. 12 and 13 are graphs respectively illustrating the output characteristics of the photosensitive unit and the performance curves relating to the means of FIG. 11.
Figure 13:
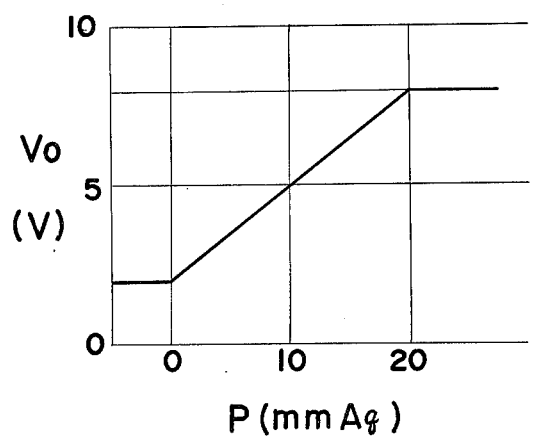

Referring now to FIG. 11, there is shown a pressure-electrical signal conversion means which has the same general construction as that described in reference to FIG. 1. The difference is that the inner surface of the low pressure side casing 1 above the plate 6 has a downwardly extending ridge portion which is disposed symmetrically with respect to the center plate 6 and constitutes a stopper 25 for preventing more than a certain amount of upward movement of the plates 6 and 7, and hence of the slit 17 in the plate 9, and the upper surface of the mounting block 14 below the plate 7 has an upwardly extending ridge portion which is disposed symmetrically with respect to the center of the plate 7 and constitutes a stopper 26 for preventing more than a certain amount of downward movement of the plates 6 and 7. The dimensions of the stoppers 25 and 26 are such that the permitted amount of displacement of the slit 17 from the abovementioned neutral position $X = 0$ is $+2$ mm or $-2$ mm. The reason for this, is that, as shown in FIG. 12, over the range of displacement of the slit 17 wherein there is a parity between the size of the illuminated area $a$ of the element 18 and that of the illuminated area $b$ of the element 19 (see FIG. 2) there is a good linear relationship between displacement of the slit 17 and output signal voltage Vo, but outside this range when practically no portion of the unit 12 is illuminated, it is practically impossible to achieve linearity of response. For the abovenoted dimensions of the various elements of the conversion means, the range of displacement of the slit 17 in which good response is achieved is $X \pm 2$ mm. Thus, if the position $X = -2$ mm of the slit 17 is the position in which the areas $a$ is almost zero the stoppers 25 and 26, by preventing movement of the slit 17 outside a range of 4 mm, ensure that only reliable values of output are produced. As shown in FIG. 13, the range of output values in this case is from 2 V to 6 V, and the corresponding range of difference of pressure P is from $P = 0$ mmAq, which is a practical required limit of a pressure detection means, to $P = 20$ mmAq. Needless to say, the linear response range is easily varied by changing the neutral setting of the slit 17 and/or the dimensions of the photosensitive unit 12.

Figure 14:
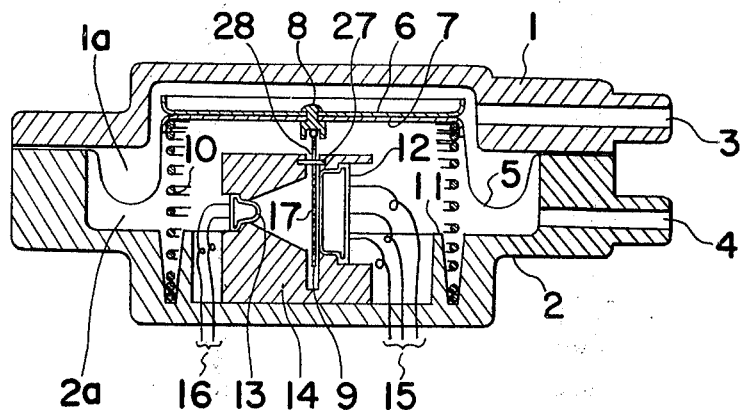
FIG. 14 is a cross-sectional view of another embodiment of the invention.
Figure 15:
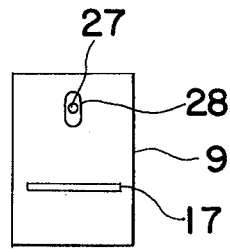
FIG. 15 is a schematic drawing showing construction of a slit board employed in the means of FIG. 14.

In FIGS. 14 and 15, with the photosensitive element 12 and light source 13 fixed, the range of displacement of the slit 17 may be controlled by providing in an upper portion of the plate 9 an elliptical slot 28 whose major axis is vertical and which encloses a rod 27 which is attached to the mounting block 14 and extends across an upper portion of the slit defined in the block 14 in which the plate 9 may slide up and down. With this construction, after a certain degree of upward movement of the plate 9 the lower end of the slot 28 comes into contact with the rod 27 and prevents further upward movement of the plate 9, and downward movement of the plate 9 more than a certain distance is prevented by the upper end of the slot 28 coming into contact with the rod 27.

Figure 16:
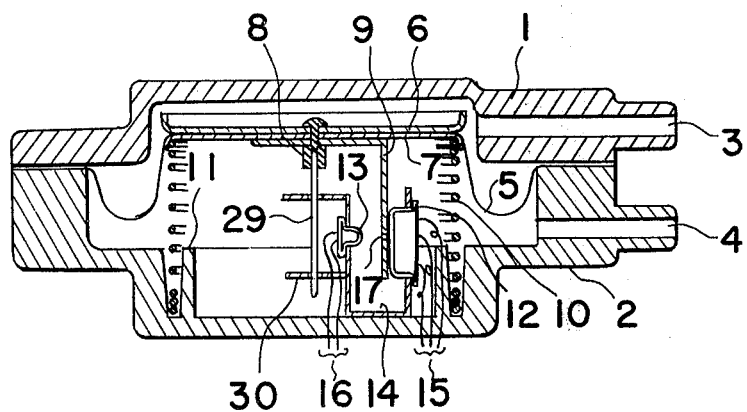
FIGS. 16, 17 and 18 are cross-sectional views of other embodiments of the invention.

In the embodiment shown in FIG. 16, the slit plate 9 is fixed or integrally attached to a bracket 9' having a horizontal portion attached to the lower surface of the displacement plate 7 by means of the stud 8, the plate 9 being out of vertical line with the stud 8 and being close to the photosensitive unit 12. The upper end of a vertically disposed rod 29 is attached to the stud 8 or a fixed extension thereof. The rod 29 is slidable in a rod guide 30 which permits movement of the rod 29 in a vertical line only. Thus, even if there is uneven distribution of pressure in either or both the compartments 1a and 2a, the plates 6 and 7 are maintained horizontal and the slit plate 9 is maintained vertical and remains accurately positioned with respect to the unit 12.

Figure 17:
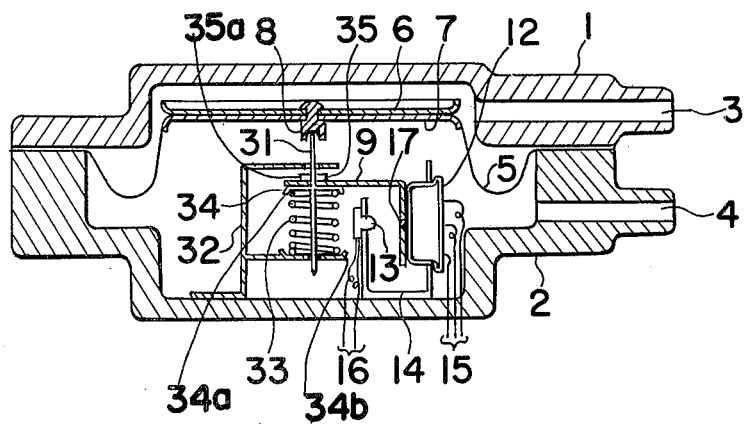

In the embodiment of FIG. 17, the light source 13 and photosensitive unit 12 are fixed, and the slit plate 9 is defined by the vertical plate of a right-angle piece 35 having a horizontal plate attached by means of a holder element 35a to a vertical rod 31. The upper end of vertical rod 31 is connected to the stud 8 and passes through and is slidable in holes defined in the upper horizontal wall and lower horizontal wall of a rod guide element 32, which permits the rod 31 to move only along a vertical line and defines a central open space. The right-angle piece 35 is attached to a portion of the rod 31 which is below the upper horizontal wall of the guide 32. In this conversion means the abovementioned compression spring 10 is not employed, but instead there is provided around the rod 31 a much smaller compression spring 33 which is held between spring retainer elements 34a and 34b which are attached to the lower surface of the horizontal plate of the right-angle piece 35 and the upper surface of the lower horizontal wall of the rod guide 32 respectively. The spring 33 is smaller than the spring 10 and it is possible to increase the sensitivity of the conversion means, since it is comparatively easy to employ a spring which exerts only a small tensile force.

Figure 18:
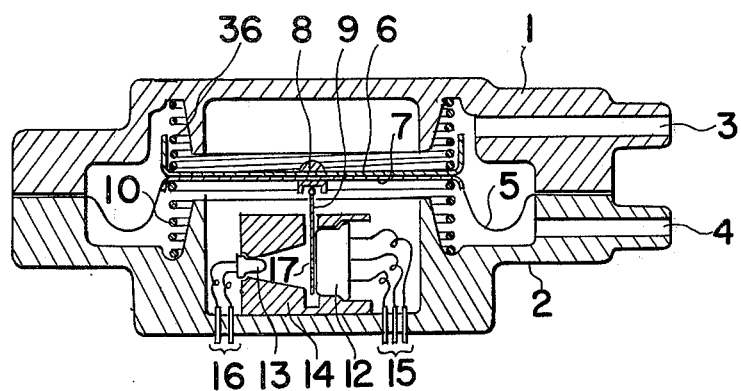

Referring now to FIG. 18, there is shown an embodiment of the invention which further permits detection of negative values of pressure difference, and in which, in addition to the compression spring 10, comprises a compression coil spring 36, whose spring constant is equal to that of spring 10 and which extends between and is held by spring retainer portions defined by the upper surface of the displacement plate 6 and the lower surface of the high-pressure side casing 1; the main features of construction of the conversion means are otherwise the same as described in reference to FIG. 1.

Figure 19:
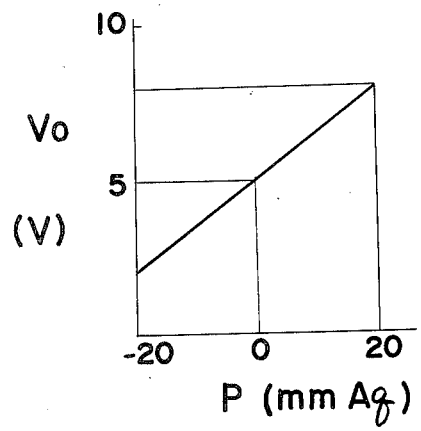
FIG. 19 is a graph plotting the characteristics of the means of FIG. 18.

Referring also to FIG. 19 the size and disposition of the elements of the means of FIG. 18 are such that when the pressure difference P is 0 the output signal voltage Vo is 5 V. If pressure in compartment 1a increases while pressure in compartment 2a remains constant, the plates 6 and 7 are moved downwards, and spring 36 is expanded and the force exerted thereby on the plate 6 becomes less while the spring 10 is compressed and the force exerted thereby becomes correspondingly greater, with the result that the output voltage from photosensitive unit 12 is increased linearly as pressure increases. The reverse action takes place if the pressure in compartment 1a falls below that in compartment 2a and a linearly decreasing output voltage Vo is produced by photosensitive unit 12. The output voltage Vo of the means of FIG. 18 ranges from 2 V to 8 V for the pressure difference angle of $0 \pm 20$ mmAq.

Figure 20:
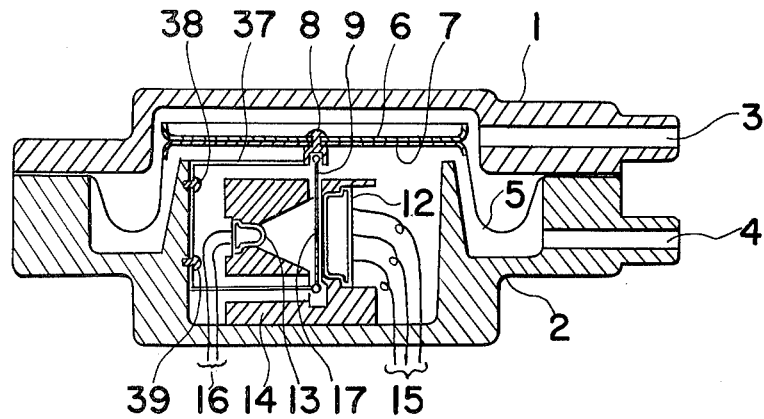
FIGS. 20 and 21 are cross-sectional views of other embodiments of the invention.

In the embodiment shown in FIG. 20, the light source 13 and photosensitive unit 12 are fixed, and the slit plate 9 is fixed to the stud 8 and may be freely moved up and down in a comparatively wide slit defined in the mounting block 14. Horizontality of the displacement plates 6 and 7 and verticality of the slit plate 9 are maintained by a bracket element 37 which has the general shape of a square U. Bracket element 37 has an upper horizontal side having one end attached to the stud 8, a lower horizontal side having one end attached to the lower end of the slit plate 9, and a vertical side which joins the horizontal sides and is slidably mounted in a pair of slide support elements 38 and 39 which are mounted in vertical alignment with one another on an inner mounting wall portion in the low pressure side casing 2.

Figure 21:
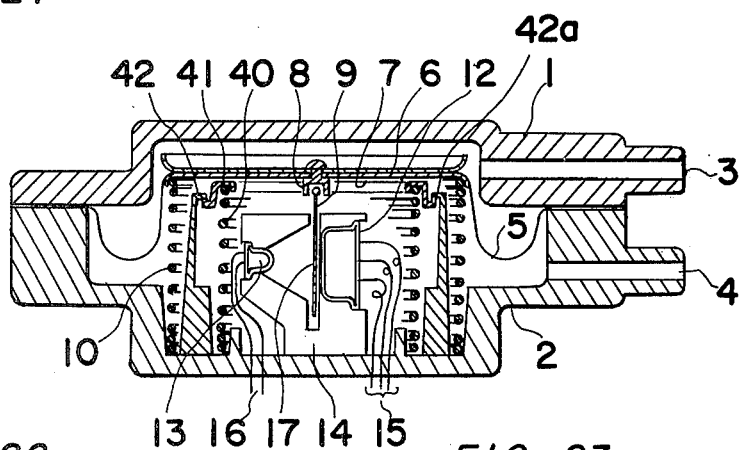

In FIG. 21 there is shown a means which is particularly suited to applications in which it is required to keep the signal output unchanged over a certain range of pressure difference, such as for example automatic control systems which wish to avoid actuation of feedback elements in response to small fluctuations of fluid pressure.

The means of FIG. 21 has the same basic construction as the means of FIG. 1, with the addition of an expansion coil spring 41, a spring force transmission element 41, and a spring retainer 42. The spring retainer 42 is attached to the inner surface of the low pressure casing 2, surrounds and extends upwards to higher that the mounting block 14, and has an upper end portion having a hook or retainer portion 42a. The spring force transmission element 41 comprises a lower end step portion which is hooked onto, but not attached to, the hook portion 42a, and a straight portion which joins the lower end step portion to an upper end step portion. The spring 40 is provided around the mounting block 14 and between the block 14 and retainer 42. The lower end of the spring 40 is mounted in a spring mount portion defined by the lower end of the retainer 42 and an upwardly projecting portion of the inner surface of the casing 2, and the upper end thereof is attached to or simply presses against the upper stepped portion of the transmission element 41.

Figure 22:
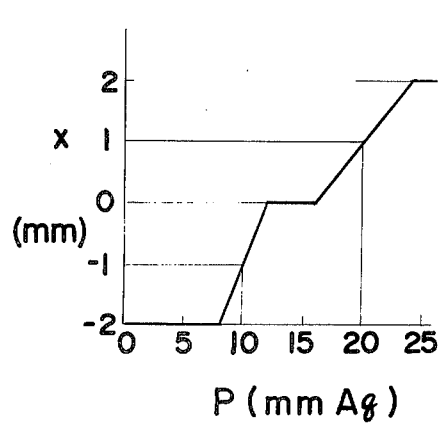
FIGS. 22 and 23 are graphs relating to the means of FIG. 21 and respectively illustrate the output characteristics of the photosensitive element employed in the means and the performance of the means.
Figure 23:
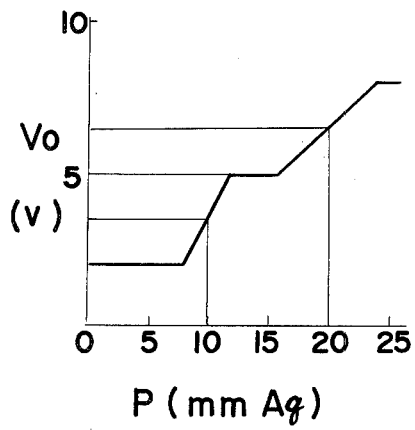

Still referring to FIG. 21, and also referring to FIGS. 22 and 23, with this construction when the pressure difference P is zero, spring 10 holds plates 6 and 7 approximately half-way between the top of the retainer element 42 and the casing 1, and exerts thereon a pressure F1. Spring 40 pushes the transmission element 41 as far upwards as is permitted by the retainer element 42, the upper stepped portion of the transmission element 41 being out of contact with and a certain distance below the plate 7 at this time. Spring 40 exerts an upward force F2 on the transmission element 41. When the pressure difference P becomes positive a downward pressure is exerted on the plates 6 and 7 but the plates 6 and 7 are not moved until the downward pressure becomes greater than the upwardly acting force F1 exerted by spring 10. Once the pressure difference P exceeds force F1, plates 6 and 7 are moved downwards and the output Vo varies proportionally as pressure difference P increases, until plate 7 is brought into contact with the upper stepped portion of transmission element 41. When this happens, any further increase of pressure difference P is temporarily ineffective in causing further downward movement of plates 6 and 7, since it is first necessary to overcome the upwardly acting force F2 exerted by spring 40, and the output Vo therefore remains constant for a certain time. When the pressure difference D increases further to and beyond the point at which force F2 also is overcome, spring force transmission elements 41 pivots about hook portion 42a of retainer element 42, plates 6 and 7 begin to be moved downwards again, and the output Vo changes accordingly. In this second stage of downward movement of plates 6 and 7, although linearity of response is maintained a given increase of pressure difference P results in less displacement of plates 6 and 7, resulting in a change of slope of portions I and II of the plots of FIGS. 22 and 23. Depending on application, the slope of portions I and II in FIGS. 22 and 23 may be different, or may be made constant by changing the geometry of the elements 18 and 19 constituting unit 12, e.g., by providing elements 18 and 19 whose widths do not change evenly.

Figure 24:
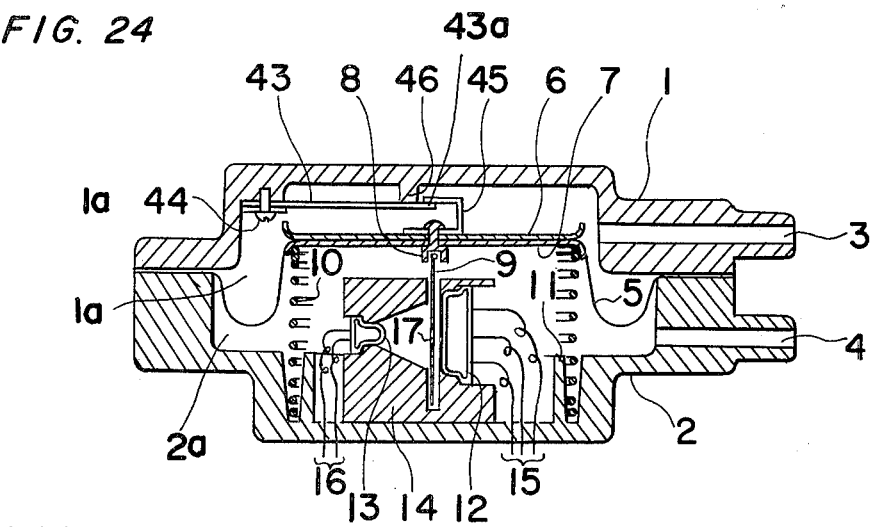
FIGS. 24 and 25 are cross-sectional views of other embodiments of the invention.

Referring to FIG. 24, the same results as achived by the means of FIG. 21 may be achieved by employing the means of FIG. 1 with the addition of a spring plate element 43. Spring plate element 43 has one end portion attached by means of a bolt or bolts 44 to a side portion of the high pressure compartment 1a, extends into compartment 1a, above displacement plate 7, to a distance such that the free end portion 43a thereof is approximately above stud 8, is mounted so that the spring force thereof is exerted upwards, and is prevented from moving upward more than an amount bringing it about a horizontal line by a downwardly projecting portion 46 integerally attached to the inner surface of casing 1, and channel-shaped element 46 which has one side attached to stud 8 and one side projecting to above and engageable by the free end portion 43a of plate spring 43. In this embodiment, for a certain time during which the pressure difference P increases element 45 comes into contact with and presses downwards on the free end 43a of plate spring 43 and the pressure difference P is opposed by the spring force of plate spring 43 as well as by the spring force of spring 10, resulting in a stepped characteristic curve similar to those of FIGS. 22 and 23.

Needless to say, for both the embodiemnts of FIG. 21 and of FIG. 24 the extent and location of the stepped portions of the characteristic curves may be altered as required by suitable selection of spring constant values of the spring 10 and spring 41 or plate spring 43 and of the distance of the transmission elements from the plate 7 or of the distance between element 45 and the free end 43a of plate spring 43 when the pressure difference P is zero, or another reference value.

Figure 25:
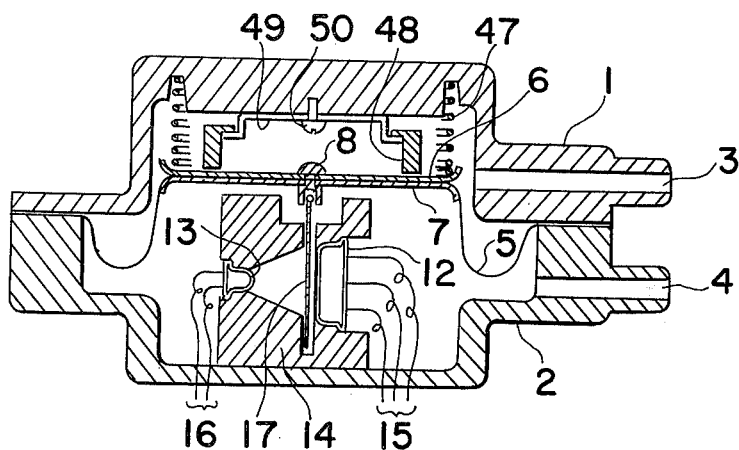

In FIG. 25 there is shown an embodiment in which port 3 is made the low pressure or reference pressure port and port 4 is employed for input of the fluid whose variations of pressure are required to detected, expansion coil spring 47 is provided between casing 1 and displacement plate 6 and a circular weight element 48 is suspended above plate 6 by a flexible element 49 fixedly attached to casing 1 by screw 50, other elements being mounted in the manner described in reference to FIG. 1.

Figure 26:
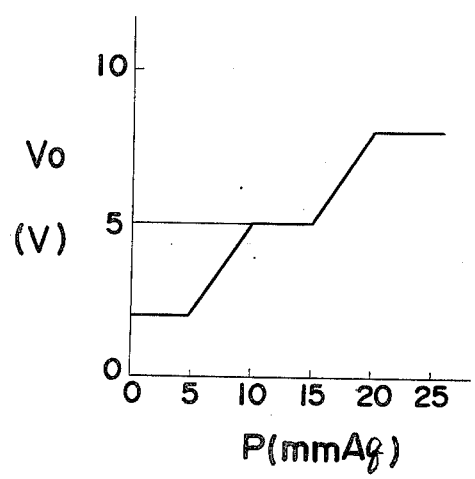
FIG. 26 is a graph showing the performance of the means of FIG. 25.

Referring to FIGS. 25 and 26, in this embodiment, as pressure difference P increases from a reference value, at first there is no displacement of plates 6 and 7, and hence no change of ouput Vo, because of the force spring 47 which must be overcome, the plates 6 and 7 are displaced in proportion to the increase of the pressure difference P. Then when plate 6 comes into contact with weight element 48, the output Vo remains unchanged until the increase of force due to the pressure difference P exceeds the downward force exerted by weight element 48, and then the output Vo again increases linearly with increasing pressure difference P.

Figure 27:
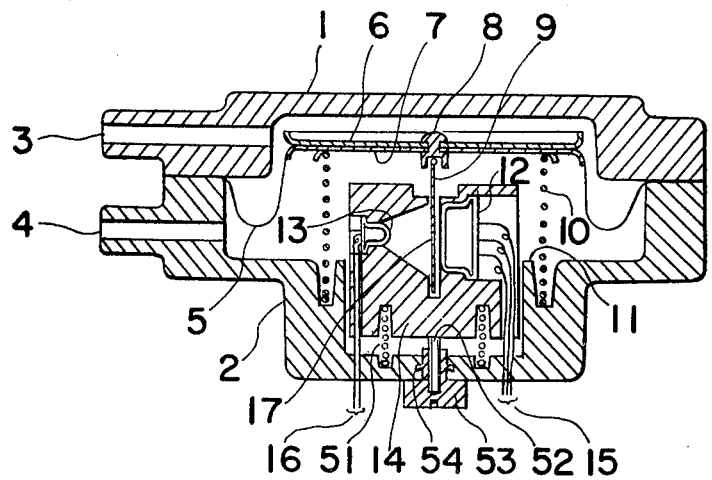
FIGS. 27 and 28 are cross-sectional views of other embodiments of the invention.

Depending on the application of the pressure-electrical signal conversion means, it may be desired to position the slit 7 in line with different portions of the photosensitive unit 12 when the means is in a neutral position. This is achievable by the means of FIG. 27. Now referring to FIG. 27, in this means light source 13 and unit 12 are mounted in mounting block 14 and block 14 is not attached to casing 2 but is slidably mounted in internal slide bearing portions of the conversion means not shown and may be moved towards or away from casing 2 by means of a screw element 52 which passes through casing 2, has an inner end which is rotatable but not slidable in a lower portion of block 14, a central threaded portion which may engage a correspondingly threaded portion of casing 2 through which screw element 52 passes, and a outer end portion attached to an externally actuable adjustment knob 53, which has a stem portion set in casing 2 and surrounded by an O ring 54 or similar seal means for preventing leakage of fluid. Between mounting block 14 and casing 2 there is provided a compression coil spring 51 which is disposed symmetrically with respect to screw 52 and has opposite ends attached to block 14 and casing 2. Displacement plates 6 and 7 and slit plate 9 are completely independent of block 14 and are moved only in accordance with the relative value of force exerted by the pressure difference P and spring 10. To change the neutral setting of the conversion means, it is simply necessary to turn knob 53 to cause block 14 to move towards or away from the high pressure compartment 1a, which action, presuming slit plate 9 is stationary has the effect of bringing slit 17 into line with a different portion of photosensitive unit 12. Knob 53 is itself or has associated therewith dial means, not shown, which indicate the relavent neutral position values of pressure or output, for example, for different settings of knob 53.

Figure 28:
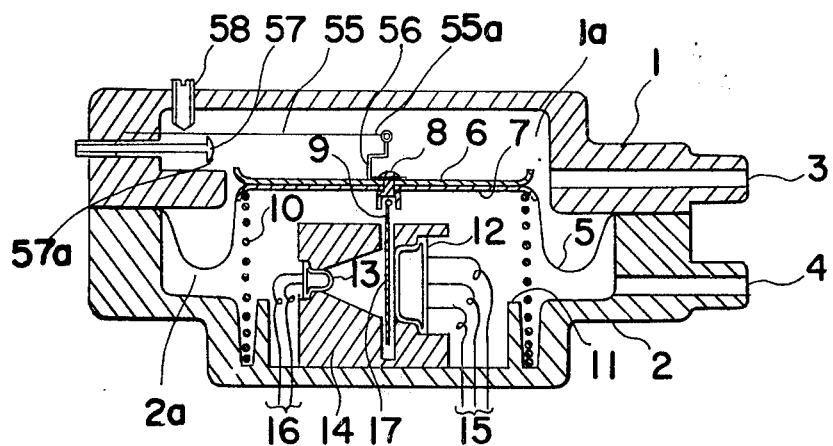
Figure 29:
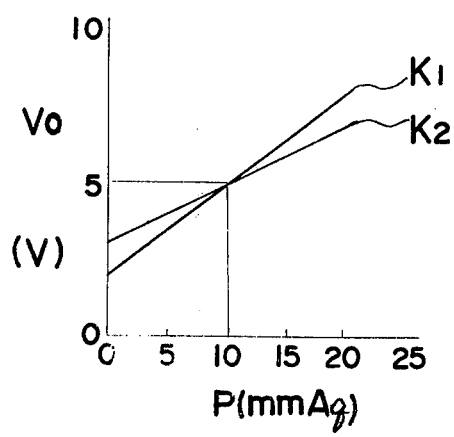
FIG. 29 is a graph showing the performance of the means of FIG. 28.

Referring now to FIG. 28 there is shown a means which causes the output Vo to the change proportionally to pressure difference P at selected rates of change. The means shown has the same construction as that of FIG. 1 with the addition of a plate spring 55, connector 56, adjustment screw 57, and compensation screw 58. Plate spring 55, whose spring force acts upwardly, has one end portion attached to a side wall portion of the high-pressure side casing 1, and extends horizontally into high pressure compartment 1a a distance such that the free end portion 55a thereof is above stud 8. This free end portion 55a is connected to stud 8 by connector 56. Adjustment screw 57 is disposed parallel to plate spring 55, passes through casing 1, extends into high pressure compartment 1a below plate spring 55, has an outer end which is externally contactable and permits screw 57 to be advanced further towards or be withdrawn from the center of compartment 1a, and has a head portion 57a which contacts the lower surface of plate spring 55. Compensation stud 58 is externally contactable, extends downwards through the upper wall of casing 1, and the lower end thereof contacts the upper surface of plate spring 55 at a point between the fixed end of plate spring 58 and the portion contacted by the head portion 57a of adjustment screw 57. With this construction, displacement of plates 6 and 7 depends on the balance of the forces exerted by the pressure difference P and the springs 55 and 10, and hence is dependent on the spring constants of springs 55 and 10. The spring constant of spring 10 remains unchanged, but by moving adjustment screw 57 inwards or outwards the effective length of plate spring 55, i.e., the distance between the free end portion 55a of spring 55 and the portion thereof contacted by the head portion 57a of screw 57, is changed, and hence the spring constant of spring 55 is changed, and thus a given change in the pressure difference P results in a different amount of displacement of plates 6 and 7. This is illustrated in FIG. 29 which plots the output Vo versus the pressure difference P for different settings of adjustment screw 57. When the setting of screw 57 is such that the spring constant of plate spring 55 is comparatively small the output Vo increases comparatively rapidly with increasing pressure difference P, as indicated by the steep curve K1. If however screw 57 is adjusted inwards, the spring constant of spring 55 is increased, and the output Vo therefore increases less rapidly with increasing pressure difference P, as indicated by curve K2. Compensation screw 58 is employed to make adjustments to achieve a required output for a particular reference value of pressure difference, both screws 57 and 58 having associated therewith suitable indication means not shown.

Figure 30:
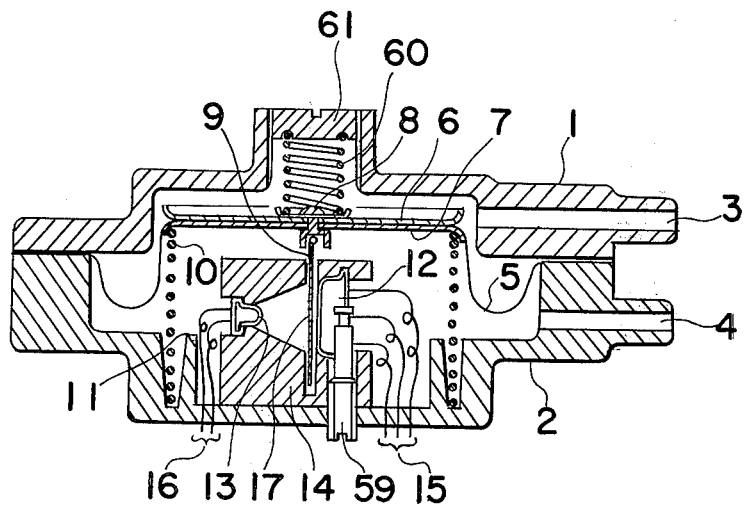
FIG. 30 is a cross-sectional view of another embodiment of the invention.
Figure 31:
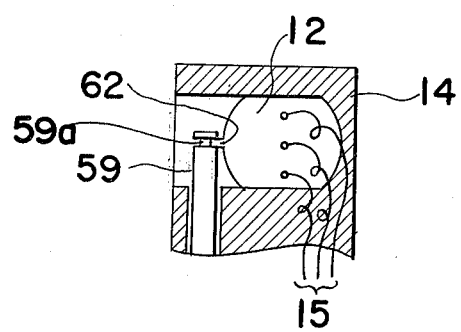
FIG. 31 is a detail view of elements of the means of FIG. 30.
Figure 32:
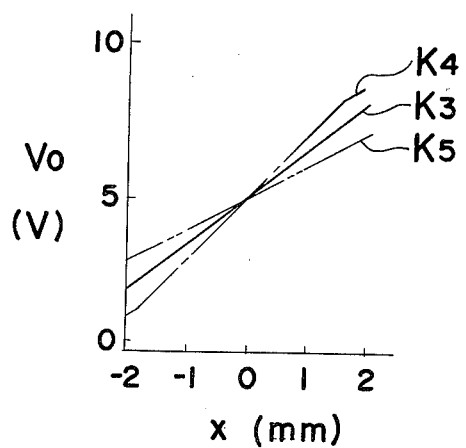
FIG. 32 is a graph of the characteristics of the means of FIG. 30.

Referring now to FIGS. 30 and 31, according to another embodiment of the invention, in addition to being loaded by spring 10 displacement plates 6 and 7 are loaded by a coil spring 60 which has a lower end connected to the central portion of the upper surface of plate 6 and an upper end connected to the lower surface of an externally contactable adjustment plug 61 which is mounted in an upward extension portion in the upper wall portion of casing 1. Contractable adjustment plug 61 may be moved downwards or upwards to increase or decrease the spring constant of spring 60, and so alter the rate at which the output Vo changes with changing pressure difference P. The photosensitive unit 12 in this embodiment is supported in the fixed block 14 in a manner such that it may rotate about a horizontal axis but may not otherwise move with respect to block 14. Unit 12 may be caused to rotate by means of an externally contactable adjustment screw 59 which extends upwards through casing 2 and has a notched end portion 59a in which is engaged a small projection 62 which is attached to the periphery of the rear mount portion of unit 12. At any given setting of slit 17, upward or downward movement of adjustment screw 59 causes the photosensitive surface to pivot clockwise or counterclockwise as seen in FIG. 2, while remaining parallel to plate 9, whereby the dimensions of illuminated areas $a$ and $b$ of elements 18 and 19 are changed. By suitable adjustment of the settings of screw 59 and plug 61 therefore it is possible to achieve an output which changes at varying rates with displacement of plates 6 and 7, and to bring the output to the same value in all cases when plates 6 and 7 are at the neutral position $X = 0$, as illustrated in FIG. 32.

The means of FIGS. 28 and 31 offer particular advantages when employed in automatic control systems, since the output can be easily matched to the control or other circuits to be actuated in response to a pressure change, and one and the same means may therefore be employed in different control systems, and may be rapidly adjusted to meet different requirements in any one control system.

Figure 33:
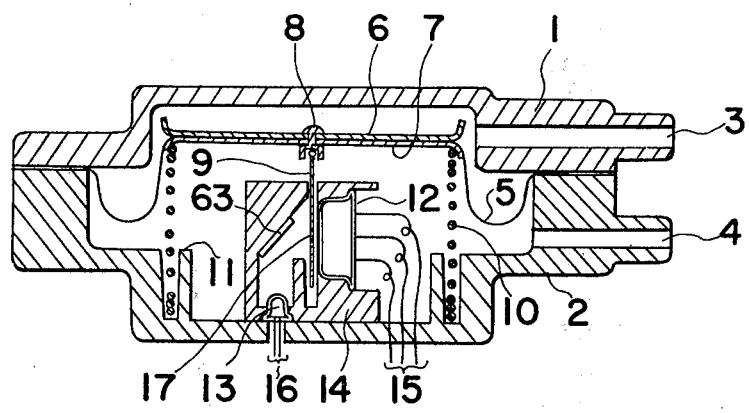
FIGS. 33 and 34 are cross-sectional views of other embodiments of the invention.
Figure 34:
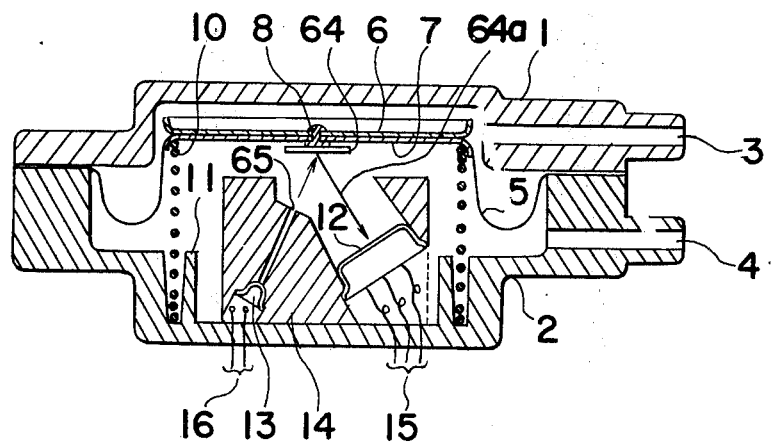

FIGS. 33 and 34 show a pressure-electrical signal conversion means according to the invention which allow greater freedom in the location of constituent parts.

In FIG. 33, the light path from light source 13 to photosensitive unit 12 is longer than the light path in the device of FIG. 1. Unit 12 is positioned in the same manner in block 14 but source 13 being mounted in casing 2 in such a manner that light is directed upwards through an internal space defined by block 14, impinges on a fixed reflector 63 which is mounted at an angle of 45° to the horizontal on an internal wall portion of block 14, and is reflected through 90° by reflector 63 and directed thereby through slit 17 to unit 12, plate 9 and slit 17 being movable in response to pressure change in any of the above described manners.

In FIG. 34, plate 9 is dispensed with, and there is affixed to the lower end of stud 8 a plate 64 which carries a strip 64a of downwardly facing reflector material which is parallel to plates 6 and 7. Light source 13 is mounted in a lower portion of block 14 and the light emitted thereby is directed upwards through an inclined slit 65 defined by block 14 and onto reflector strip 64a which directs the light downwards along a path inclined to the vertical to photosensitive unit 12 which is mounted in a lower portion of block 14 and so disposed that the photosensitive surface thereof is normal to the path of light reflected from strip 64a. With this construction, as the plates 6 and 7 move downwards or upwards the light reflected by strip 64a illuminates increasingly leftward or rightward portions of unit 12 as seen in the drawing, thus resulting in an output Vo which varies with variations of pressure.

Needless to say, since the pressure P exerted by a fluid is related to rate of flow Q thereof by the equation $Q = A \cdot P$, A being a constant, the various embodiments of the invention described above may be employed to detect rate of flow by providing in the casings 1 and 2 ports which permits fluid to flow through the means. Also, of course, it is not essential that pressure in one compartment remain constant but pressure may vary in both compartments.

An example of an application of the means of the invention is illustrated in FIGS. 35 and 36, to which reference is now had. In this application, the means is associated with the central heat control installation, for example of a furnace, which has a plurality of hot or cold air ports and which is required to maintain outflow at some ports constant even if some ports are closed, pressure in the wind box of the installation being maintained constant in order to achieve this, whereby heating or cooling of associated means is effected in an optimum manner.

The means of the invention permits this control to be effected with maximum precision, but also prevents hunting or other instability of the control system as a whole.

In FIG. 35, a motor 102 drives a blower B which drives air into a wind storage box C having a plurality of outlet ports D connecting to ducts, not shown, which are to be supplied with air from wind box C. One compartment of a pressure-electrical signal conversion means F such as described above is connected to the interior of wind box L by duct E, the pressure in the other compartment of the conversion means being maintained constant.

The electric power to actuate motor 102 is controlled by triac 103 associated with diode 104, capacitor 105, zener diodes 106 and 107 and resistance 108 constituting a DC power supply circuit. This circuit connects to a pressure detection circuit which is constituted by variable resistors 109a and 109b which are the elements 18 and 19 constituting the photosensitive unit 12 of conversion means F, photoemissive diode 110, transistor 112, and resistors 111, 113 and 114. Power supply is stepped up by a DC amplification circuit constituted by resistors 115, 117, 119, 120, 121 and 125, transistors 116 and 122, and capacitor 124. The gate input to triac 103 is supplied by a trigger circuit which is constituted by capacitor 125, and switching element 126, and synchronization with the commercial power supply is effected by a synchronization circuit constituted by resistors 127, 128, 132, 134, 136 and 138, diodes 129 and 130, zener diodes 131, and transistors 133, 135, and 137. These various circuits, i.e., the DC power supply circuit, pressure detection circuit, DC amplification circuit, trigger circuit, and synchronization circuit, together constitute a phase control circuit of triac 103.

Referring also to FIG. 36, the control circuit of FIG. 35 functions as follows. Supposing first that triac 103 is in a conducting state, current flows in motor 102 and at time to of sequence I of FIG. 36, load current IL flowing in motor 102 is not zero even though the voltage Vs of commercial supply is zero because load current IL lags voltage Vs in phase, as shown in sequence II of FIG. 36. During the succeeding half-cycle of voltage Vs, in which voltage Vs is negative as seen in the drawing, at time t1 load current IL becomes zero, triac 103 becomes non-conductive, and voltage VL across opposite terminals of motor 102 becomes zero. At this time, as shown in sequence I of FIG. 36, a voltage VT is imposed across opposite terminals of triac 103. Taking the potential at terminal T1 of triac 103 as the reference, potential at terminal T2 is negative. This polarity is the requisite polarity for conduction of diode 129 of the synchronization circuit, and if voltage VT is more than several volts, current flows through resistor 128, diode 129, and resistor 127, transistor 135 becomes fully conductive, and transistor 137 is therefore turned off.

The zener diode 131 is selected such that the zener voltage thereof is slightly greater than the DC power supply voltage of the DC power supply circuit. Thefefore, during the time that potential at terminal T2 of triac 103 is in the range of from zero to the value of the DC supply voltage with respect to that at terminal T1 of triac 103 current flow is stopped by zener diode 131 and transistor 133 remains non-conductive, current flow being stopped by diode 130 and the same effect achieved when the terminal T1 - terminal T2 potential is lower than this range. In other words, when terminal T1 is more than several volts negative with respect to terminal T2 of triac 103, transistor 135 conducts, transistor 133 does not conduct, and so transistor 137 is made non-conductive, as shown in sequence III of FIG. 36.

When transistor 137 is non-conductive, the difference between the detection signal of the pressure detection circuit and voltage corresponding to the set pressure is amplified by the DC amplification circuit, capacitor 125 starts to be charged as current flows through transistor 122 and resistor 123, and as shown in sequence IV of FIG. 36, there is a linear increase of voltage Vc across opposite plates of capacitor 125. When at time t2, voltage Vc reaches the set switching voltage of switching element 126, element 126 is rendered momentarily conductive, resulting in application of a voltage VG to the gate of triac 103, as shown in sequence V of FIG. 36, and triac 103 becomes conductive, after which voltage VL is applied across motor 102 and voltage VT across terminals T1 and T2 of triac 103 becomes more or less equal to zero, as indicated in sequence I and sequence II of FIG. 36.

With voltage VT across triac 103 close to zero, current stops flowing in resistor 128, diode 129 and resistor 127, and, since transistor 133 is not conducting, transistor 135 becomes non-conductive, and transistor 137 is turned on. Therefore, current which up to this point had been flowing through transistor 122 and resistor 123 and changing capacitor 125 now flows to transistor 137, with the result that capacitor 125 is no longer charged, and the voltage VC across capacitor 125 becomes practically zero.

Thus at time t2, triac 103 becomes conductive, voltage VL is applied across motor 102, and load current IL flows, but at time t3, even though voltage of the commercial supply 101 leaves a negative half-cycle to enter a positive half-cycle, load current IL, which lags as noted before, becomes zero at time t4, and triac 103 becomes non-conductive, voltage VT appears, and voltage VL across opposite terminals of motor 102 becomes zero. Then, terminal T2 of triac 103 becomes positive with respect to terminal T1, and when it becomes more than several volts positive, conditions no longer permit diode 129 to conduct, and at the same time a voltage exceeding the zener voltage of zener diode 131 is applied to zener diode 131, and so current flows through resistor 127, diode 130, zener diode 131, and resistor 132, and transistor 133 is made conductive. This results in current flow through resistors 128 and 134 and consequent turn-on of transistor 135, and turn-off of transistor 137. Therefore a charging current flows into capacitor 125, and the previously described action is continuously repeated, whereby motor 102 forces air into wind box B at a rate to maintain pressure in wind box B equal to a set value.

Considering in more detail the action of the conversion means F, the resistance of the resistors 109a and 109b constituted by elements 18 and 19 of photosensitive unit 12 vary inversely to one another as pressure in wind box B varies, and the voltage at the junction of resistors 109a and 109b varies accordingly. As the impedance of these elements also varies greatly depending on degree of illumination and ambient temperature, as well as on position of the slit 17, transistor 112 and resistor 113 are provided as an emitter-follower for impedance matching with the next stage, a voltage corresponding to the voltage at the junction of resistors 109a and 109b being obtained at the emitter of transistor 112.

This voltage is supplied through resistors 114 and 115 to the base of transistor 116 whose emitter receives input of set value which is supplied through resistor 117 provided for setting the degree of amplification from the junction of a voltage divider constituted by resistors 118 and 119 and which compares this set input with the value of voltage at the junction of resistors 109a and 109b, and produces an amplified output indicative of this comparison.

The collector of transistor 116 supplies voltage through a voltage divider constituted by resistors 120 and 121 to a constant current circuit constituted by transistor 122 and resistor 114. The base of transistor 122 is connected to the junction of resistors 120 and 121 and the emitter thereof is connected to resistor 114 through a feedback capacitor 124.

Supposing now that pressure in the wind box C becomes low, base voltage el of transistor 112 is lowered, the voltage at the emitter of transistor 112 becomes lower, and therefore there is greater current flow through the collector of transistor 116, voltage at the junction of resistors 120 and 121 rises, and transistor 122 supplies an increased charging current to capacitor 125. As a result of the increased charging current supplies to capacitor 125, the switching voltage of switching element 126 is achieved in a shorter time, triac 103 is therefore switched from a non-conductive to a conductive state in a shorter time, the voltage applied on motor 102 is increased, and blower B causes an increased supply of air into, and hence raised pressure in, wind box C.

If pressure in wind box C increases, action is the reverse of that described above, and the pressure in wind box C is therefore constantly maintained within a narrow range of values centering on a set value of pressure.

Momentary variations of pressure in wind box C are of course liable to occur even if the operation of blower B is very stable and all ports D are open, and it is therefore desirable to avoid actuation of the control system in response to such fluctuations, since such actuation would result in of oscillations in motor 102 or the control system as a whole. Such a phenomenon is avoided by inclusion of feedback capacitor 124 in the circuit of FIG. 35. If pressure in wind box C becomes low momentarily, voltage at the junction of resistors 114 and 115 tends to become low, and so collector current of transistor 116 and emitter voltage of transistor 122 should rise. However, by making the resistor 114 comparatively large, the charging of capacitor 124 proceeds slowly. In other words, there is practically no change of charge on capacitor 124 in response to a momentary fluctuation in the preceding stages of the circuit, and so the voltage at the junction of resistors 114 and 115 rises in accordance with the rise of emitter voltage of transistor 122, i.e., feedback capacitor 124 prevents the junction voltage of resistors 114 and 115 from becoming low for other reasons. Thus, even if output signals from unit F contain irregular alternating components, the circuit action is generally unaffected, and stable triggering of triac 103 and control of motor 102 are achieved.

It is also possible to smooth pressure detection signals by including a narrow portion in duct E. However, this has the disadvantage that blockage of duct E may occur more easily and control is therefore best achieved by use of capacitor 124 and resistor 114, and selection of suitable values of capacity and resistance thereof.

In addition of course there may be employed a means such as described in reference to FIG. 21, which has an output of stepped form, and the dimensions and electrical or physical properties of elements are so selected that the output remains unchanged during variations of pressure in wind-box C over a small range centering on the standard pressure required to be maintained in wind-box C.

To limit the action of the conversion means F to a certain range of pressure variation there may be employed means such as described in reference to FIG. 11 or means such as shown in FIG. 37, which comprises a high pressure side casing 139 having a port 141 which connects to duct E, a low pressure side casing 140 having a port 142, an assembly dividing the interior of the conversion means into two compartments and constituted by diaphragm 143 displacement plates 144 and 145 which are held by stud 146 and loaded by spring 149 and mounting block 150 which has mounted therein light source 110 and photosensitive unit 109. Mounting block 150 is seated through spring 153 on casing 140, is movable upwards or downwards to alter the neutral setting of the conversion means by the turning of an externally contactable knob connected to block 150 by screw 151. Mounting block 150 has a slot in which may slide a vertically disposed slit plate 147 whose upper end is attached to stud 8 and which is disposed between light source 110 and unit 109. Slit plate 147 has in a generally central portion thereof a slit 148 through which light from light source 110 may pass to illuminate unit 109, and also has in an upper portion thereof a slot 156 with a vertically disposed long axis which encloses a stopper rod 157 which is fixed across the upper end of slot defined in block 140, whereby plate 147 may move upwards and downwards only over a certain range.

The main advantages of the invention may be summarized as follows.

(1) The conversion means is easily and rapidly adjustable to respond to different conditions in different heating, cooling or ventilation systems.

(2) Good linearity and sensitivity of response is achieved, but there are no problems of oscillation or unnecessary response to momentary fluctuations.

(3) Although the means can respond to small pressures of the order of only a few millimeters of water, component parts of the means are all sturdy elements, thereby ensuring long service life and greatly facilitating handling of the conversion means.

(4) Being constituted by simple elements the conversion means can be manufactured cheaply as individual units. In addition since the means of the invention are settable to meet different conditions it is not necessary to provide different conversion means in different compartments, line segments, etc. of a control system, but the same type of conversion means may be employed in all parts of the control system, whose installation and maintenance are therefore made such easier as well as less costly.

What is claimed is:

1. A pressure-electrical signal conversion means comprising;
   a main housing enclosing an interior space and having at least one inlet port adopted for admitting a fluid at a pressure to be measured;
   a diaphram constituted by a flexible sheet element for dividing said interior space into first and second compartments, said inlet port communicating with only said first compartment and for being moved by the force resulting from a pressure difference in said compartments;
   a pressure receiving plate attached to a central portion of said diaphram;
   a biasing means in one of said separate compartments for applying a force to said pressure receiving plate in a direction to vary the volume ratio of said two separate compartments whose magnitude is proportioned to the position of said pressure receiving plate; and
   pressure receiving plate position determining means located in one of said compartments including a light source for emitting light, a photosensitive unit for converting light impinging thereon to an electrical output having a pair of adjacent photosensitive elements of the same photosensitive material and a light image forming means coupled to said pressure receiving plate for receiving the light emitted by said light source and forming a light image on said photosensitive unit whose position its responsive to the position of said pressure receiving plate, in which the photoelectrical characteristics of each of said photosensitive elements vary complementarily in a direction parallel to the movement of said light image, whereby said photosensitive unit produces an electrical output which varies in proportion to the position of said pressure receiving plate.

2. Means as claimed in claim 1, wherein second pressure compartment is provided with an inlet port communicating with the atmosphere and incorporates therein said light source, photosensitive unit, light image forming means and association means.

3. Means as claimed in claim 1, wherein said light image forming means is a slit plate displaced together with said pressure receiving plate having a slit for passing part of the light emitted from said light source to said photosensitive unit.

4. Means as claimed in claim 1, wherein said light source and said photosensitive unit are fixed, the photosensitive surface of said photosensitive unit faces and is generally normal to the optical path of light emitted by said light source, and said light image forming means is constituted by a slit plate which is attached to and movable together with said pressure receiving plate is disposed between said light source and said photosensitive unit close to said photosensitive unit, and has a slit through which light emitted by said light source may pass to impinge on said photosensitive unit.

5. Means as claimed in claim 1, further comprising means for limiting the range of relative movement of said photosensitive unit and said light image formed by said light image forming means, whereby said electrical output is produced only in response to variation of said pressure difference in a certain range.

6. Means as claimed in claim 4, in which said slit plate further has a slot having a long axis generally parallel to the line of movement of said plate and which further comprises a fixed stop rod means which passes through said slot in said plate, whereby the range of movement of said plate is limited.

7. Means as claimed in claim 4, which further comprises stopper elements which limit the range of movement of said pressure receiving plate.

8. Means as claimed in claim 4, which further comprises slit board guide means in which said slit board may slide, and which permits only rectilinear movement of said slit plate, whereby displacement of said slit plate due to uneven distribution of pressure in said means is prevented.

9. Means as claimed in claim 5, which further comprises rod guide means connection to said pressure receiving plate and permitting movement of said plate in one direction only.

10. Means as claimed in claim 9, wherein said rod guide means and said pressure receiving plate are attached and said pressure receiving plate is held at right-angles to said rod guide means.

11. Means as claimed in claim 9, wherein said rod guide means is biased with a compression spring which is compressed when said pressure receiving plate is moved in one direction due to said pressure difference.

12. Means as claimed in claim 5, wherein displacement of said pressure receiving plate is linear for changes of said pressure difference in any direction.

13. Means as claimed in claim 12, wherein said biasing means comprises two spring means which apply force in opposed directions.

14. Means as claimed in claim 12, wherein said biasing means is constituted by a plate spring means which applies a force on said pressure receiving plate whatever the direction of movement of said pressure receiving plate.

15. Means as claimed in claim 1 which further comprises range elements which prevent movement of said pressure receiving plate in response to certain ranges of variation of said pressure difference.

16. Means as claimed in claim 15, wherein said biasing means comprises two spring means, at least one of which applies a force on said pressure receiving plate in response to a certain range of variation of said pressure difference.

17. Means as claimed in claim 15, wherein said biasing means comprises at least one spring means, and which further comprises a weight element whose weight opposes movement of said pressure receiving plate during movement of said pressure receiving plate in one direction.

18. Means as claimed in claim 1, which further comprises adjustment means actuable to adjust the relationship between said electrical output and said pressure difference.

19. Means as claimed in claim 18, wherein said adjustment means permits adjustment of the mounting position of at least said photosensitive unit to cause different portions of said photosensitive unit to be illuminated by said light image forming means when said pressure receiving plate is in a given position relative to said photosensitive unit.

20. Means as claimed in claim 18, wherein said adjustment means is connected to said biasing means applying a force to pressure receiving plate and permits adjustment of the force applied by said biasing means to said pressure receiving plate.

21. Means as claimed in claim 18, wherein said biasing means includes at least one plate spring means and said adjustment means permits adjustment of the effective length of said plate spring means whereby a given variation of said pressure difference results in a different amount of displacement of said pressure receiving plate.

22. Means as claimed in claim 18, wherein said adjustment means permits adjustment of the position of said photosensitive unit, whereby a different portion of said photosensitive unit is illuminated by said light image forming means when said pressure receiving plate is in a given position relative to said photosensitive unit.

23. Means as claimed in claim 1, wherein said photosensitive unit is fixed and said light source and said light image forming means connect to and move together with said pressure receiving plate.

* * * * *